(12) United States Patent
Chou et al.

(10) Patent No.: US 7,342,579 B2
(45) Date of Patent: Mar. 11, 2008

(54) THIN FILM TRANSISTOR ARRAY PLATE, LIQUID CRYSTAL DISPLAY PANEL AND METHOD OF PREVENTING ELECTROSTATIC DISCHARGE

(75) Inventors: Jui-Yuan Chou, Taipei County (TW); Chih-Lung Yu, Tainan County (TW); Chien-Kuo Ho, Taipei County (TW)

(73) Assignee: Chunghwa Picture Tubes, Ltd., Taipei (TW)

( * ) Notice: Subject to any disclaimer, the term of this patent is extended or adjusted under 35 U.S.C. 154(b) by 527 days.

(21) Appl. No.: 10/711,879

(22) Filed: Oct. 11, 2004

(65) Prior Publication Data

US 2006/0077162 A1    Apr. 13, 2006

(51) Int. Cl.
  *G09G 5/00* (2006.01)
(52) U.S. Cl. ........................... 345/214; 345/904
(58) Field of Classification Search .......... 345/87–102, 345/104, 211, 204, 214; 349/40, 42, 39; 257/355, 360, 59, 72; 326/52, 54, 9; 340/905, 340/907
See application file for complete search history.

(56) References Cited

U.S. PATENT DOCUMENTS

| | | | | |
|---|---|---|---|---|
| 5,930,607 A * | 7/1999 | Satou | .................. | 438/158 |
| 6,317,108 B1 * | 11/2001 | Kalt | .................. | 345/85 |
| 6,493,047 B2 * | 12/2002 | Ha | .................. | 349/40 |
| 6,914,643 B1 * | 7/2005 | Nagase et al. | .................. | 349/40 |
| 7,088,330 B2 * | 8/2006 | Nagata et al. | .................. | 345/100 |
| 7,170,475 B2 * | 1/2007 | Vissenberg | .................. | 345/74.1 |
| 7,187,204 B2 * | 3/2007 | Tanada | .................. | 326/52 |
| 2002/0080109 A1 * | 6/2002 | Nagata et al. | .................. | 345/92 |
| 2004/0027502 A1 * | 2/2004 | Tanaka et al. | .................. | 349/40 |
| 2007/0103423 A1 * | 5/2007 | Tsai et al. | .................. | 345/100 |

FOREIGN PATENT DOCUMENTS

| | | |
|---|---|---|
| JP | 09-171167 | 6/1997 |
| JP | 2002-090424 | 3/2002 |

\* cited by examiner

*Primary Examiner*—Nitin I. Patel
(74) *Attorney, Agent, or Firm*—Jianq Chyun IP Office

(57) ABSTRACT

A thin film transistor array plate, a liquid crystal display panel and a method of preventing electrostatic discharge thereof are provided. The thin film transistor array comprises a substrate, pixel structures, switching devices, lead lines and electrostatic discharge (ESD) protecting circuits. The substrate has a display region and a peripheral circuit region. The pixel structures are disposed within the display region and the switching devices are disposed within the peripheral circuit region. The lead lines are disposed on the substrate to electrically connect the pixel structures and the switching devices. The ESD protecting circuits are disposed within the peripheral circuit region such that each ESD protecting circuit is electrically connected to the corresponding switching devices. The ESD protecting circuits prevent electrostatic discharge, simplify the circuit layout and improve production efficiency of the plate and the panel.

18 Claims, 3 Drawing Sheets

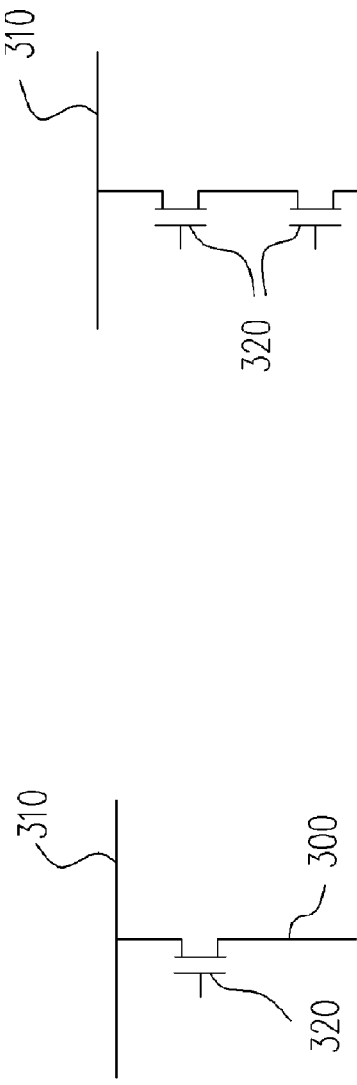
FIG. 3A
FIG. 3B
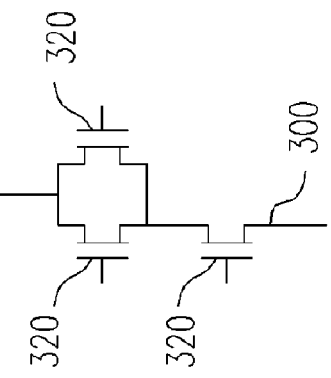
FIG. 3C
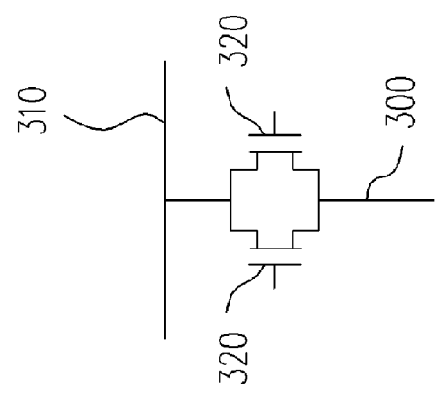
FIG. 3D

THIN FILM TRANSISTOR ARRAY PLATE, LIQUID CRYSTAL DISPLAY PANEL AND METHOD OF PREVENTING ELECTROSTATIC DISCHARGE

BACKGROUND OF THE INVENTION

1. Field of the Invention

The present invention generally relates to a device array plate, a display panel and a method of preventing electrostatic discharge. More particularly, the present invention relates to a thin film transistor array plate, a liquid crystal display panel and a method of preventing electrostatic discharge.

2. Description of Related Art

Through the rapid development of multi-media technologies, image data are now transmitted mostly in a digital format instead of an analogue format. To fit the life style of modern people, video or image devices have an increasingly light and compact design. Although the conventional display such as cathode ray tube (CRT) has superior display quality and relatively cheap to procure, the electron gun structure within the CRT renders it bulky, heavy and power hungry. Moreover, radiation harmful to the eyes may also be produced. With big leaps in the techniques of manufacturing opto-electronic and semiconductor devices, flat panel displays such as liquid crystal display (LCD) have been rapidly developed. Because a LCD panel is light and slim, has a low operating voltage and emits no hazardous radiations, it has gradually replaced CRT to become one of the mainstream display products.

A liquid crystal display mainly comprises a liquid crystal display panel and a backlight module. The liquid crystal display module further comprises a color filter plate, a thin film transistor array plate and a liquid crystal layer sandwiched between the two substrates. The backlight module provides a planar light source for illuminating the displayed data on the liquid crystal display panel. In addition, the thin film transistor array plate can be divided into a display region and a peripheral circuit region. A plurality of pixel structures is disposed within the display region. The pixel structures comprise an array of thin film transistors and an array of pixel electrodes corresponding to the transistors. A plurality of gate lines and source lines extending from the display region are disposed within the peripheral circuit region. The gate lines and source lines are connected the thin film transistors within the display region for driving the pixel electrodes and twisting of the liquid crystals above.

The process of fabricating the thin film transistor array plate often includes an electrical test to determine the performance of the pixel structures on the substrate and repair any defective devices (such as thin film transistors or pixel electrodes) or lead lines. Conventionally, either a direct contact or a non-contact testing method is used. In a direct contact testing method, probing pins are permitted to contact the external contact pads of gate lines and source lines directly. Thereafter, testing signals are transmitted from a testing station in sequence to check the electrical performance of each thin film transistor. In the non-contact testing method, a plurality of testing lines are serially connected to odd numbered gate lines, even numbered gate lines, odd numbered source lines and even numbered of source lines. Thereafter, testing signals are transmitted to the input terminal of the testing lines and then an optical module is used as a non-contact signal receiver to assess the electrical performance of the thin film transistors.

Furthermore, external factors such as transportation or changes in the environment may lead to the accumulation of some static electric charges in the liquid crystal display panel. When the accumulation of static charges exceed a definite amount, an electrostatic discharge may occur resulting in some damage in the circuit lines or the thin film transistor on the thin film transistor array plate. To protect the circuits and transistors, an outer short ring is often set up inside the peripheral circuit region of the thin film transistor array plate and serially connected to the gate lines and the source lines through a plurality of switching devices. When an excess of electric charges is accumulated on the circuit lines and transistors, the switching device is turned on to permit an outflow of static charges to the outer short ring and prevent any internal discharge.

However, if the thin film transistor array plate with electrostatic discharge protection capability needs to perform a non-contact testing, the peripheral circuit region of the thin film transistor array plate must accommodate a testing circuit as well as an outer short ring. Consequently, the peripheral circuit region may not have an area large enough to accommodate all the circuit lines or else a very complicated circuit layout has to be deployed in the peripheral circuit region. In other words, the process of fabricating the thin film transistor array plate is hard to simplify and hence overall productivity difficult to increase.

SUMMARY OF THE INVENTION

Accordingly, the present invention is directed to a thin film transistor array plate that utilizes the original testing circuits to provide electrostatic discharge protection and simplify the circuit layout and hence shortens the processing time.

The present invention is also directed to a liquid crystal display panel that utilizes the original testing circuits on a thin film transistor array plate to provide electrostatic discharge protection and simplify the circuit layout and hence shortens the processing time.

The present invention is also directed to a method of preventing electrostatic discharge that utilizes the original testing circuit on a thin film transistor array plate to provide electrostatic discharge protection and simplify the circuit layout and hence increase productivity.

According to an embodiment of the present invention, a thin film transistor array plate comprising a substrate, a plurality of pixel structures, a plurality of switching devices, a plurality of lead lines and a plurality of electrostatic discharge (ESD) protection circuits is provided. The substrate has a display region and a peripheral circuit region. The pixel structures are disposed within the display region and the switching devices are disposed within the peripheral circuit region. The lead lines are disposed on the substrate and are electrically connected with the pixel structures and the switching devices. The ESD protecting circuits are disposed within the peripheral circuit region such that each ESD protecting circuit is electrically connected to portions of the switching devices.

According to another embodiment of the present invention, a liquid crystal display panel comprising a color filter plate, a thin film transistor array plate and a liquid crystal layer between the color filter plate and the thin film transistor array plate is provided. The thin film transistor array plate comprises a substrate, a plurality of pixel structures, a plurality of switching devices, a plurality of lead lines and a plurality of electrostatic discharge (ESD) protection circuit. The substrate has a display region and a peripheral circuit region. The pixel structures are disposed within the display region and the switching devices are disposed within the peripheral circuit region. The lead lines are disposed on the substrate and electrically connected with the pixel structures and the switching devices. The electrostatic discharge protection circuits are disposed within the peripheral circuit region such that each ESD protection circuit is electrically connected to portions of the switching devices.

According to another embodiment of the present invention, an alternative thin film transistor array plate comprising a substrate, a plurality of gate lines, a plurality of source lines, a plurality of thin film transistors, a plurality of pixel electrodes, a plurality of switching devices, a first electrostatic discharge protection circuit, a second electrostatic discharge protection circuit, a third electrostatic discharge protection circuit and a fourth electrostatic discharge protection circuit is provided. The substrate has a display region and a peripheral circuit region. The gate lines and the source lines are disposed on the substrate to define the display region into a plurality of pixel areas. In addition, each thin film transistor is disposed inside one of the pixel areas and electrically connected to one of the gate lines and one of the source lines correspondingly. Each pixel electrode is positioned within a pixel area and electrically connected with a corresponding thin film transistor. The switching devices are disposed within the peripheral circuit region. Each switching device is electrically connected to one of the gate lines and the source lines. Furthermore, the first ESD protection circuit, the second ESD protection circuit, the third ESD protection circuit and the fourth ESD protection circuit are disposed inside the peripheral circuit region. The first ESD protection circuit is electrically connected to odd numbered gate lines through portions of the switching devices. The second EDS protection circuit is electrically connected to even numbered gate lines through portions of the switching devices. The third ESD protection circuit is electrically connected to odd numbered source lines through portions of the switching devices. The fourth ESD protection circuit is electrically connected to even numbered source lines through portions of the switching devices.

According to another embodiment of the present invention, a method of preventing electrostatic discharge (ESD) in the aforementioned thin film transistor array plate and the liquid crystal display panel is provided. When a lead line or other element on the thin film transistor array plate accumulates too much electric charges, a corresponding switch device is switched on to dissipate the electric charges to a corresponding ESD protection circuit.

Accordingly, the thin film transistor array plate, the liquid crystal display panel and the method of preventing electrostatic discharge in the present invention all utilize the original electrical testing circuits as ESD protection circuits. Since there is no need to provide additional circuits for ESD protection, circuit layout in the peripheral circuit region is very much simplified and hence processing time for fabricating the display panel is shortened.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIGS. 3A through 3D are diagrams showing the construct of various types switching devices to be used in the thin film transistor array plate according to the present invention.

DESCRIPTION OF THE EMBODIMENTS

Figure 1:
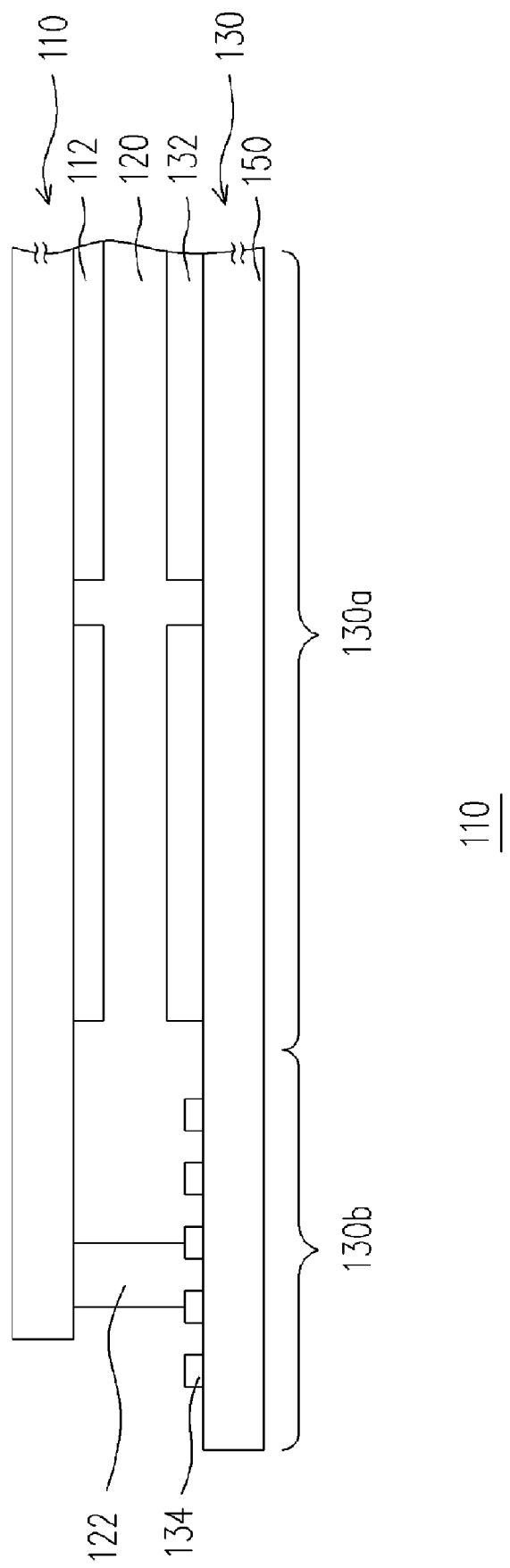
FIG. 1 is a sectional view showing part of a liquid crystal display panel according to one embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

FIG. 1 is a sectional view showing part of a liquid crystal display panel according to one embodiment of the present invention. To simplify FIG. 1, only relevant components are sketched. The liquid crystal display panel 100 in FIG. 1 comprises a color filter plate 110, a liquid crystal layer 120 and a thin film transistor array plate 130. The color filter plate 110 and the thin film transistor array plate 130 are joined together through a sealant 122. The liquid crystal layer 120 is disposed within the space bounded by the color filter plate 110, the thin film transistor array plate 130 and the sealant 122. In addition, the color filter plate 110 comprises several color filter patterns 112. The thin film transistor array substrate 130 can be divided into a display region 130a and a peripheral circuit region 130b, for example. Several pixel structures 132 are disposed within the display region 130a corresponding to the color filter patterns 112, and lead lines 134 are disposed within the peripheral circuit region 130b. The lead lines 134 are, for example, gate lines 136 or source lines 138 (as shown in FIG. 2) and serve as driving lines for the liquid crystal display panel 100.

Figure 2:
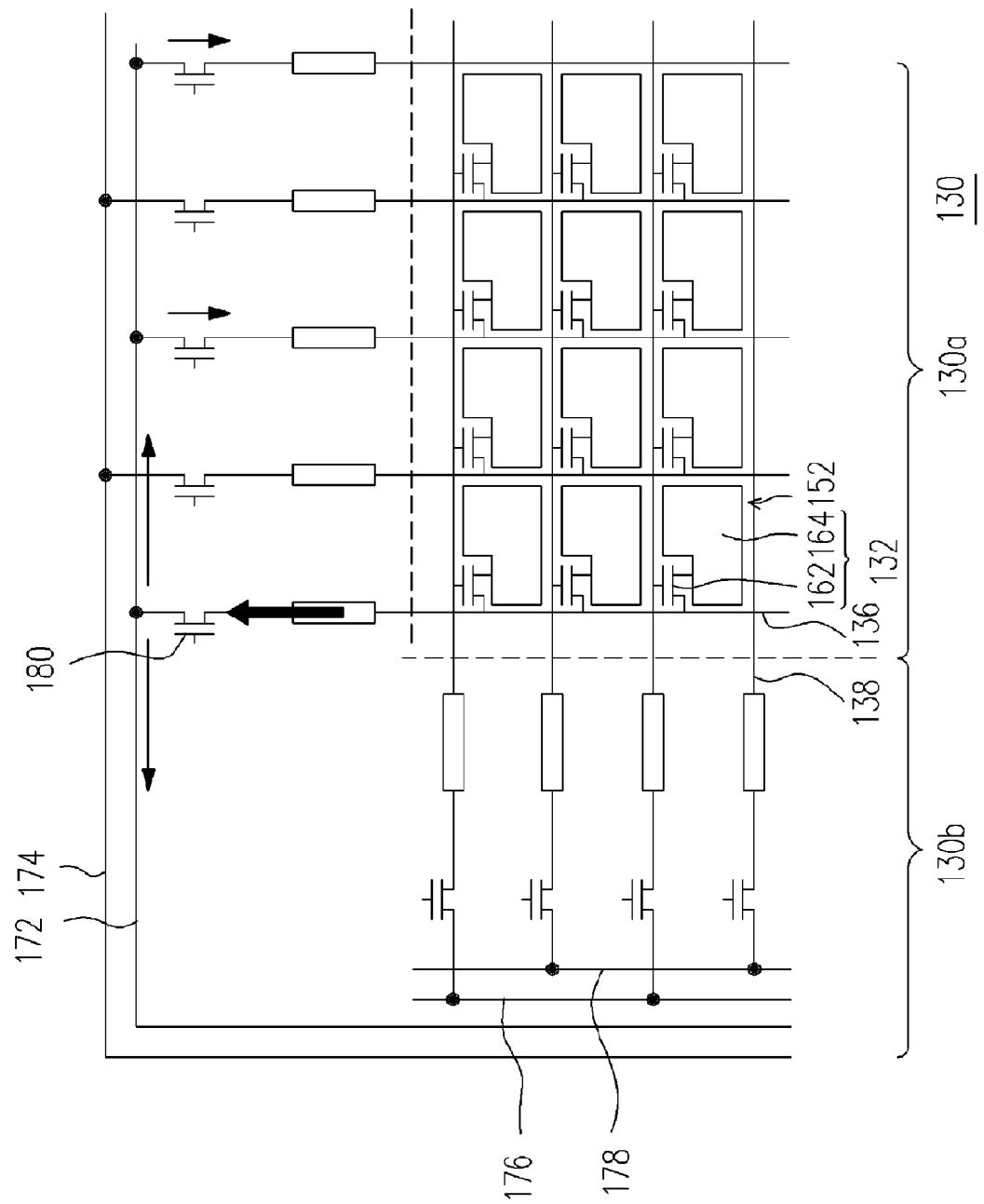
FIG. 2 is a diagram showing the circuit lines on the thin film transistor array plate in FIG. 1.

FIG. 2 is a diagram showing the circuit line layout on the thin film transistor array plate in FIG. 1. As shown in FIG. 2, gate lines 136 and source lines 138 are disposed on the substrate 150 (shown in FIG. 1) of the thin film transistor array plate 130. The gate lines 136 and the source lines 138 define the display region 130a into several pixel areas 152. Each pixel area 152 has a thin film transistor 162 electrically connected to and driven by a corresponding gate line 136 and a source line 138. Furthermore, each pixel area 152 has a pixel structure comprising a pixel electrode 162 electrically connected to the thin film transistor 162 within the pixel area. When a driving signal is transmitted to the thin film transistor 162, the liquid crystal molecules in the liquid crystal layer 120 (as shown in FIG. 1) above the pixel electrode 164 are twisted accordingly to produce a particular display.

Furthermore, electrostatic discharge (ESD) protection circuits are disposed within the peripheral circuit region 130b of the thin film transistor array plate 130. In FIG. 2, four electrostatic discharge protection circuits including a first ESD protection circuit 172, a second ESD protection circuit 174, a third ESD protection circuit 176 and a fourth ESD protection circuit 178 are shown. The first ESD protection circuit 172, the second ESD protection circuit 174, the third ESD protection circuit 176 and the fourth ESD protection circuit 178 are electrically connected to odd numbered gate lines 136, even numbered gate lines 136, odd numbered source lines 138 and even numbered source lines 138 through various switching devices 180. The switching devices 180 are thin film transistors or other semiconductor devices, for example.

The aforementioned first ESD protection circuit 172, second ESD protection circuit 174, the third ESD protection circuit 176 and the fourth ESD protection circuit 178 also permit a conventional non-contact electrical testing of the thin film transistor array plate to be carried out during fabrication. Since the procedure for carrying out the non-contact electrical test should be familiar those skilled in the technique, detailed description is omitted.

It should be noted that the aforementioned first ESD protection circuit 172, second ESD protection circuit 174, the third ESD protection circuit 176 and the fourth ESD protection circuit 178 together provide an electrostatic discharge protection function. In FIG. 2, the arrows show the pathways through which accumulated static charges are channeled away and disposed. For example, excess static charges may accumulate on a particular pixel structure 132 in the thin film transistor array plate 110 of a liquid crystal display panel 100 (shown in FIG. 1), say, due to transportation or other external factors. When this happens, the switching device 180 on one particular odd numbered gate line 136 having electrical connection with the pixel structure 132 is switched on so that the accumulated charges on the pixel structure 132 and the gate line 136 are dissipated to the first ESD protection circuit 172. Thereafter, the electric charges on the ESD protection circuit 172 are redistributed to other circuits or devices, thereby preventing a direct electrostatic discharge damage inside the display panel. Clearly, the location of the accumulated charges will directly affect the redistribution pathway of the electric charges.

It should be noted that the aforementioned embodiment is just an example of a thin film transistor array plate and hence should by no means limit the scope of the present invention. In other embodiments of the present invention, the number of ESD protection circuits and their layouts can be modified. Furthermore, the method of connecting the ESD protection circuit and the gate or source lines may differ according to the type of electrical tests to be carried out or the layout design of the circuits.

In addition, the type of switching devices 180 connected to the gate lines or source lines or the number of switching devices 180 deployed can be varied according to the actual requirements. FIGS. 3A through 3D are diagrams showing the construct of various types switching devices to be used in the thin film transistor array plate according to the present invention. In FIG. 3A, a conductive line 300 (a gate line or a source line) and an ESD protection circuit 310 are connected together through a single thin film transistor 320 serving as the switching device. In FIG. 3B, the conductive line 300 (a gate line or a source line) and the ESD protection circuit 310 are connected together through at least two serially connected thin film transistors 320. In FIG. 3C, the conductive line 300 (a gate line or a source line) and the ESD protection circuit 310 are connected together through at least two parallel connected thin film transistors 320. Finally, in FIG. 3D, the conductive line 300 (a gate line or a source line) and the ESD protection circuit 310 are connected together through a plurality of serially connected and parallel connected thin film transistors 320. The purpose of using a multiple of thin film transistors to form the switching device is that the switching device can still function normally when one of the thin film transistors fails to operate.

In summary, the thin film transistor array plate, the liquid crystal display panel and the method of preventing electrostatic discharge in the present invention all utilize the original electrical testing circuits as ESD protection circuits. Through the switching devices on the ESD protection circuit, excess electric charges are redirected to the ESD protection circuit in a controlled manner. In other words, the ESD protection circuit not only serves as a circuit for non-contact testing during the fabrication process, but also provides ESD protection thereafter. Since there is no need to provide additional circuits for ESD protection, circuit layout in the peripheral circuit region is very much simplified and hence processing time for fabricating the display panel is shortened.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A thin film transistor array plate, comprising:
   a substrate, having a display region and a peripheral circuit region;
   a plurality of pixel structures, disposed inside the display region;
   a plurality of switching devices, disposed inside the peripheral circuit region;
   a plurality of lead lines, disposed on the substrate, wherein each one of the lead lines electrically connects to the corresponding pixel structures and one of the switching devices; and
   a plurality of electrostatic discharge (ESD) protection circuits, disposed inside the peripheral circuit region, wherein each one of the ESD protection circuits is electrically connected to the corresponding switching devices, wherein the ESD protection circuits comprises:
      a first electrostatic discharge protection circuit, electrically connected to odd numbered gate lines;
      a second electrostatic discharge protection circuit, electrically connected to even numbered gate lines;
      a third electrostatic discharge protection circuit electrically connected to odd numbered source lines; and
      a fourth electrostatic discharge protection circuit, electrically connected to even numbered source lines.

2. The thin film transistor array plate of claim 1, wherein the lead lines comprise a plurality of gate lines and a plurality of source lines.

3. The thin film transistor array plate of claim 1, wherein the switching devices comprise thin film transistors.

4. The thin film transistor array plate of claim 1, wherein each switching device comprises at least two serially connected thin film transistors.

5. The thin film transistor array plate of claim 1, wherein each switching device comprises at least two parallel-connected thin film transistors.

6. The thin film transistor array plate of claim 1, wherein each switching device comprises at least a plurality of parallel-connected and serially connected thin film transistors.

7. A method of preventing electrostatic discharge for the thin film transistor array plate in claim 1, the method comprising the steps of:
   switching on one of the corresponding switching devices to permit the passage of any excessive electric charges accumulated on any one of the lead lines and the subsequent redirection of those electric charges to one of the corresponding electrostatic discharge protection circuits.

8. A liquid crystal display panel, comprising:
a color filter plate;
a thin film transistor array plate, having a display region and a peripheral circuit region, comprising:
   a plurality of pixel structures, disposed inside the display region;
   a plurality of switching devices, disposed inside the peripheral circuit region;
   a plurality of lead lines, disposed on the substrate, wherein each lead line electrically connects the corresponding pixel structures and one of the switching devices; and
   a plurality of electrostatic discharge (ESD) protection circuits, disposed inside the peripheral circuit region, wherein each one of the ESD protection circuits is electrically connected to portions of the switching devices, wherein the ESD protection circuits comprises:
      a first electrostatic discharge protection circuit, electrically connected to odd numbered gate lines;
      a second electrostatic discharge protection circuit, electrically connected to even numbered gate lines;
      a third electrostatic discharge protection circuit, electrically connected to odd numbered source lines; and
      a fourth electrostatic discharge protection circuit, electrically connected to even numbered source lines; and
a liquid crystal layer, disposed between the color filter plate and the thin film transistor array plate.

9. The liquid crystal display panel of claim 8, wherein the lead lines comprises a plurality of gate lines and a plurality of source lines.

10. The liquid crystal display panel of claim 8, wherein the switching devices comprise thin film transistors.

11. The liquid crystal display panel of claim 8, wherein each switching device comprises at least two serially connected thin film transistors.

12. The liquid crystal display panel of claim 8, wherein each switching device comprises at least two parallel-connected thin film transistors.

13. The liquid crystal display panel of claim 8, wherein each switching device comprises at least a plurality of parallel-connected and serially connected thin film transistors.

14. A thin film transistor array plate, comprising:
a substrate, having a display region and a peripheral circuit region;
a plurality of gate lines, disposed on the substrate;
a plurality of source lines, disposed on the substrate, wherein the gate lines and the source lines define the display region into a plurality of pixel areas;
a plurality of thin film transistor, each thin film transistor disposed inside one of the pixel area, wherein each one of the thin film transistors is electrically connected to one of the gate lines and one of the source lines correspondingly;
a plurality of pixel electrode, each pixel electrode positioned inside one of the pixel areas and electrically connected to a corresponding thin film transistor;
a plurality of switching devices, disposed inside the peripheral circuit region, wherein each one of the switching devices is electrically connected to one of the gate lines and the source lines;
a first electrostatic discharge protection circuit, disposed inside the peripheral circuit region, wherein the first electrostatic discharge protection circuit is electrically connected to odd numbered gate lines through portions of the switching devices;
a second electrostatic discharge protection circuit, disposed inside the peripheral circuit region, wherein the second electrostatic discharge protection circuit is electrically connected to even numbered gate lines through portions of the switching devices;
a third electrostatic discharge protection circuit, disposed inside the peripheral circuit region, wherein the third electrostatic discharge protection circuit is electrically connected to odd numbered source lines through portions of the switching devices; and
a fourth electrostatic discharge protection circuit, disposed inside to peripheral circuit region, wherein the fourth electrostatic discharge protection circuit is electrically connected to even numbered source lines through portions of the switching devices.

15. The thin film transistor array plate of claim 14, wherein the switching devices comprise thin film transistors.

16. The thin film transistor array plate of claim 14, wherein each switching device comprises at least two serially connected thin film transistors.

17. The thin film transistor array plate of claim 14, wherein each switching device comprises at least two parallel-connected tin film transistors.

18. The thin film transistor array plate of claim 14, wherein each switching device comprises at least a plurality of parallel-connected and serially connected thin film transistors.

* * * * *